United States Patent [19]

Locacius

[11] 4,402,518
[45] Sep. 6, 1983

[54] LAMINATED VALVE COVER GASKET ASSEMBLY HAVING SEALING LAYERS OF DIFFERENT THICKNESSES AND MATERIALS

[75] Inventor: Robert F. Locacius, Lake Zurich, Ill.

[73] Assignee: Felt Products Mfg. Co., Skokie, Ill.

[21] Appl. No.: 313,954

[22] Filed: Oct. 22, 1981

[51] Int. Cl.³ .............................................. F16J 15/10
[52] U.S. Cl. .............................. 277/166; 277/235 B;
123/90.38
[58] Field of Search ........................ 123/90.37, 90.38;
277/235 B, 166, DIG. 6

[56] References Cited

U.S. PATENT DOCUMENTS

| | | | |
|---|---|---|---|
| 2,981,247 | 4/1961 | Gaebler | 277/166 |
| 3,231,289 | 1/1966 | Carrell | 277/166 |
| 3,625,527 | 3/1970 | Brindle | 123/90.38 |
| 3,913,927 | 10/1975 | Gordon | 277/235 B |
| 3,936,059 | 2/1976 | Gordon | 277/235 B |
| 4,072,316 | 2/1978 | Decker et al. | 277/235 B |
| 4,201,804 | 5/1980 | Stecher et al. | 277/235 B |
| 4,223,897 | 9/1980 | Staab et al. | 277/235 B |
| 4,351,534 | 9/1982 | McDowell | 277/235 B |

*Primary Examiner*—Robert I. Smith
*Attorney, Agent, or Firm*—Dressler, Goldsmith, Shore, Sutker & Milnamow, Ltd.

[57] ABSTRACT

A laminated valve cover gasket disposed between the valve cover and the head of an internal combustion engine providing a perimetric seal therebetween, including a metallic core, the body of which is imperforate, a relatively thick, conformable cork-rubber facing layer overlying the body, a relatively thin, fiber-reinforced rubber facing layer underlying the body, the cork-rubber facing layer being at least twice as thick as the fiber-reinforced rubber facing layer, and adhesive securing each of the layers to the body. The gasket assembly defines a central opening and a perimetric portion clamped between the flange of the valve cover and the engine head to provide the perimetric seal.

4 Claims, 4 Drawing Figures

LAMINATED VALVE COVER GASKET ASSEMBLY HAVING SEALING LAYERS OF DIFFERENT THICKNESSES AND MATERIALS

TECHNICAL FIELD

A wide variety and combinations of materials are used in making automotive gaskets. A variety of such gaskets embodying such materials and combinations of materials have successfully, fulfilled their purposes for years. However, more recently, and especially as lighter-weight parts of less dimensionally stable materials have been used in automobiles, sealing problems have increased dramatically and gaskets which had functioned satisfactorily previously no longer are as effective.

BACKGROUND OF THE INVENTION

One environment in which increasing sealing problems have been encountered is in the sealing of valve covers to engine heads. Valve covers have been made of lighter weight materials, such as of aluminum and even of plastic, both of which tend to distort and deflect. Further, the heads are less dimensionally stable, compounding the difficulty of sealing.

Previously multilayer valve cover gaskets have employed combinations of a perforated metallic core and cork-rubber layers, even cork-rubber layers of different thicknesses, to attempt to provide an effective valve cover seal. However, it has been found that the perforated core, with the formed tangs, tends to rupture the associated cork-rubber layers, thereby destroying the impervious, sealing characteristics of the gasket. When conventional rubber-fiber or rubber-asbestos sheets were substituted for the cork-rubber layers it was found that they were ineffective to produce an adequately conforming gasket, hence were ineffective to produce a gasket which sealed effectively and properly.

SUMMARY OF THE INVENTION

In accordance with the present invention an improved valve cover gasket is provided. It seals effectively and conforms properly, even with the distortion and deflection of the valve cover and head in the engines of today. Further, the gasket makes effective use of a relatively highly conforming cork-rubber sealing layer without the rupturing previously encountered when perforated metal cores were used. The gasket also takes advantage of the superior sealing characteristics of a fiber-rubber layer, such as an asbestos-rubber sealing layer, while essentially eliminating the tendency of gaskets employing such layers not to seal effectively because of the relative non-conformability of such abestos-rubber layers.

An improved laminated valve cover gasket assembly of this invention is intended for disposition between a valve cover and the head of an internal combustion engine for providing a seal therebetween. The gasket assembly comprises a metallic core, the body of which is imperforate, a relatively thick, conformable cork-rubber facing layer overlying the body and a relatively thin, fiber-reinforced rubber facing layer underlying the body. The cork-rubber facing layer is at least twice as thick as the fiber-reinforced rubber facing layer. The gasket assembly defines a central opening and a perimetric portion adapted to be clamped between the flange of a valve cover and an engine head to provide a perimetric seal therebetween. An adhesive layer adhesively secures each of the layers to the core body. Preferably the facing layers are each thicker than the metallic core.

Other advantages and features of the present invention will become apparent from the following detailed description of the invention and an embodiment thereof, from the claims and from the accompanying drawings.

DETAILED DESCRIPTION OF THE ILLUSTRATIVE EMBODIMENT

Figure 1:
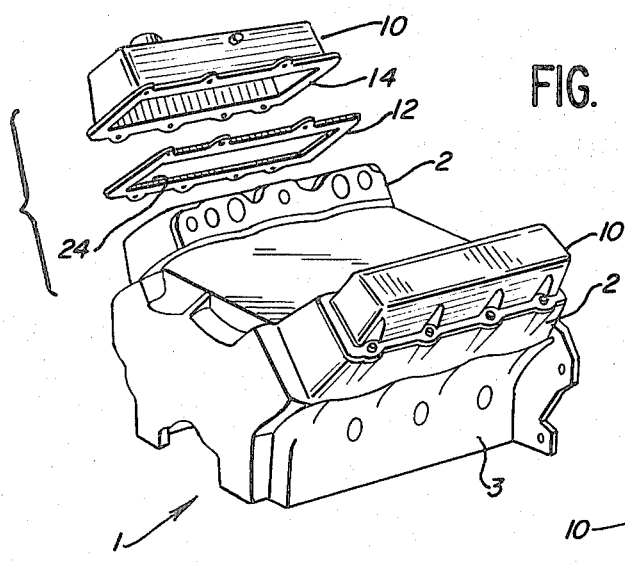
FIG. 1 is an exploded perspective view of an internal combustion engine employing a gasket assembly of this invention.
Figure 2:
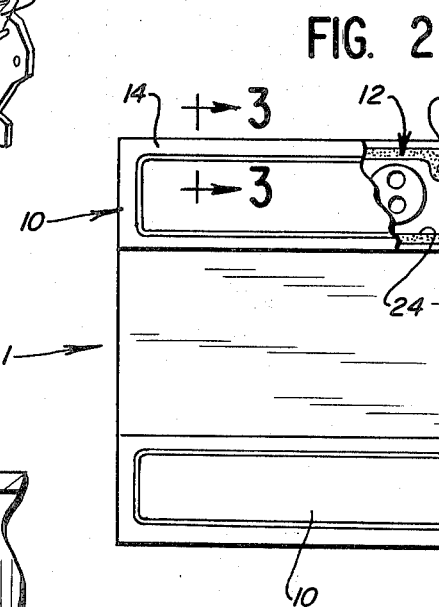
FIG. 2 is a plan view, partially broken away, of FIG. 1.
Figure 3:
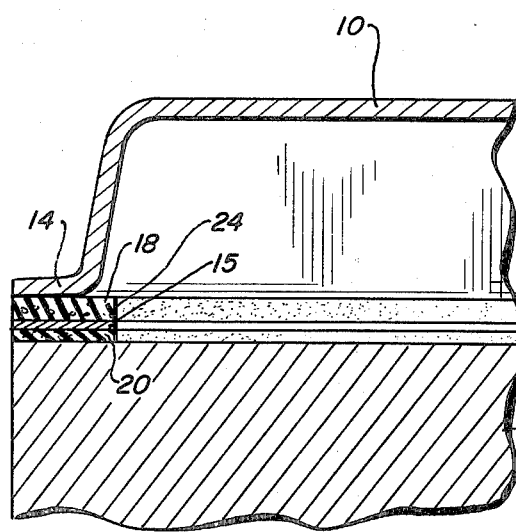
FIG. 3 is a cross sectional view taken substantially along line 3—3 of FIG. 2.
Figure 4:
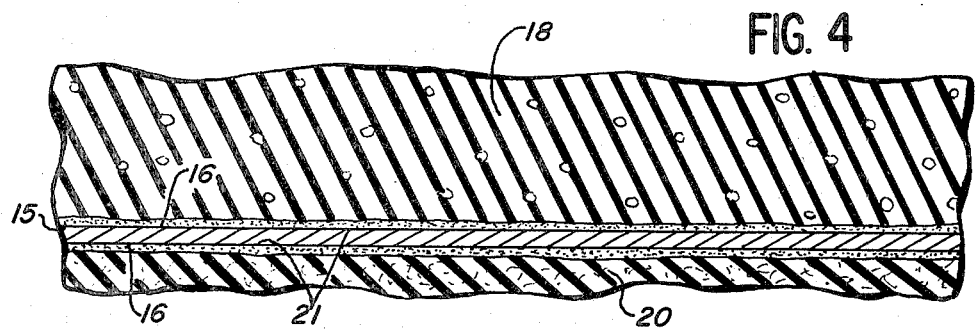
FIG. 4 is an enlarged view of a portion of FIG. 3.

Referring now to the drawings, a typical internal combustion engine 1 having a head 2 and block 3 is shown. The engine is illustrated as a V-6 engine with which two valve covers 10 and two valve cover gaskets 12 are to be used.

Valve covers 10 are of sheet metal, are relatively lightweight, and therefore have easily distortable flanges 14. Flanges 14, particularly when the valve cover gasket is to be replaced, tend to be warped and somewhat distorted from previous use and engine heat. The flanges are usually straightened and flattened manually and visually. As such it will be apparent that the flanges do not provide accurate surfaces which are precisely parallel to the mating surface of the head 2. This fact increases the demands placed upon the sealing capacity of valve cover gaskets 12.

Valve cover gasket 12 is a laminate, and is seen to comprise a generally flat, imperforate, expansive metal core 15 and a pair of generally flat expansive facing sheets. Core 15 comprises upper and lower flat or planar faces, such as surfaces 16, to which the facing sheets are laminated. The core may also be surface modified, as by etching or otherwise, in desired locations to promote adhesion.

Facing sheets 18 and 20 are laminated adhesively to the surfaces 16, as by a suitable adhesive layer 21, such as a heat-activated adhesive or by a conventional "wet" adhesive layer. Suitable heat-activatable adhesives include phenolic-nitrile rubber and polybutyral rubber which is desirably initially applied to the facing sheet surfaces, following which the facing sheets are applied to the core.

Overlying facing sheet 18 is relatively compressible and is of a cork-rubber composite material. Sheet 18 is relatively thick and is preferably to be positioned against the valve cover flange because of its greater conformability. Facing sheet 20 is less compressible, is relatively thin and is highly impermeable. Facing sheet 20 is preferably of a fiber reinforced rubber, such as an asbestos-rubber sheet.

Underlying facing sheet 20 is relatively thin and is preferably of a rubber asbestos material. It may incorporate asbestos, glass fibers, or other suitable fibrous materials, and may utilize nitrile, neoprene or polyacrylic elastomers as a binder. The binder may comprise from about 15 to about 25% of the facing sheet, whether asbestos fibers, or whether other organic or inorganic fibers, fillers or the like are used. Facing sheet 20 generally resists degradation by oils and coolants, retains torque, minimizes extrusion, and exhibits heat resistance.

Facing sheet 18 preferably comprises a cork-rubber formulation, such as one containing cork particles and a binder such as nitrile rubber. The cork particles used in fabricating the sheet range between 10 and 20 mesh, i.e., pass through a sieve opening of 0.0787 inch and 0.033 inch, respectively. The sieve openings are in accordance with ASTM-11 sieve standards. The cork is present in an amount of about 35 to 40% and the binder is present in an amount of about 60 to 65% by weight. The binder may include fillers, such as carbon black and others, in amounts of up to 30 to 40% by weight of the binder.

The gasket assembly 12 is preferably die-cut or blanked out, such as with a stamping machine, punch press or other suitable form of equipment to provide the central opening 24 and the bolt holes 26. Thus the gasket assembly provides a perimetric gasket portion adapted to be clamped between the flange 14 of the valve cover and the head 2 to provide a perimetric seal therebetween.

In the embodiment illustrated the core 15 is about 0.007 inch in thickness, and is of cold rolled steel. The thickness may vary. To enhance adherence, the core surfaces 16 may be phosphatized, i.e., coated with a phosphate coating, in a conventional manner, or may be otherwise surface treated to improve adhesion.

The cork-rubber facing layer 18 may be 1/16" thick and the rubber-asbestos facing layer 20 may be about 1/64" thick. It will be seen that the cork-rubber sheet 18 is substantially thicker, and preferably at least two to four times as thick as the rubber-asbestos sheet 20. Additionally, each of the facing layers 18 and 20 is thicker than the core 15.

The gasket assembly of this invention seals effectively and well. Further, as compared to cork-rubber gaskets or cork-rubber gaskets with a central metal core and pairs of cork-rubber sheets having a total cork-rubber thickness the same as a cork-rubber gasket, the gasket of this assembly displays lower bulge and lower torque loss, both of which are of advantage in providing an effective seal.

It will be apparent from the foregoing that further embodiments of this invention may be made without departing from the spirit and scope of the invention. Accordingly, the scope of the invention is to be considered as being limited only insofar as may be made necessary by the appended claims.

What is claimed is:

1. A laminated valve cover gasket assembly for disposition between a valve cover and a head of an internal combustion engine for providing a perimetric seal therebetween, comprising
   a metallic core, the body of which is imperforate,
   a relatively thick, conformable cork-rubber facing layer overlying said body,
   a relatively thin, fiber-reinforced rubber facing layer underlying said body, said cork-rubber facing layer being at least twice as thick as said fiber-reinforced rubber facing layer, and
   adhesive securing each of said layers to said body,
   said gasket assembly defining a central opening and a perimetric portion adapted to be clamped between the flange of a valve cover and an engine head to provide a perimetric seal therebetween.

2. A laminated valve cover gasket assembly in accordance with claim 1 in which said facing layers are each of greater thickness than said metallic core.

3. A laminated valve cover gasket assembly in accordance with claim 2 in which said fiber-reinforced rubber facing layer is an asbestos-rubber facing layer.

4. A sealed engine assembly comprising a laminated valve cover gasket assembly disposed between a valve cover and the head of an internal combustion engine and providing a perimetric seal therebetween, said gasket assembly comprising
   a metallic core, the body of which is imperforate,
   a relatively thick, conformable cork-rubber facing layer overlying said body,
   a relatively thin, fiber-reinforced rubber facing layer underlying said body, said cork-rubber facing layer being at least twice as thick as said fiber-reinforced rubber facing layer, and
   adhesive securing each of said layers to said body,
   said gasket assembly defining a central opening and a perimetric portion clamped between the flange of said valve cover and said engine head to provide said perimetric seal therebetween.

* * * * *